(Model.)
M. BRUNELL.
DRAFT EQUALIZER.
No. 265,379. Patented Oct. 3, 1882.
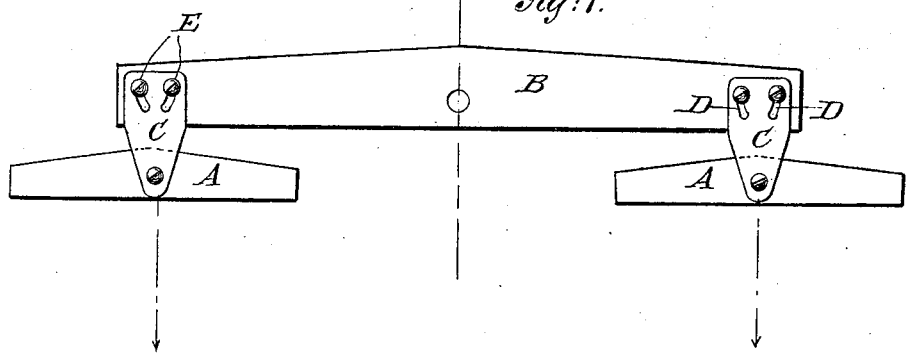
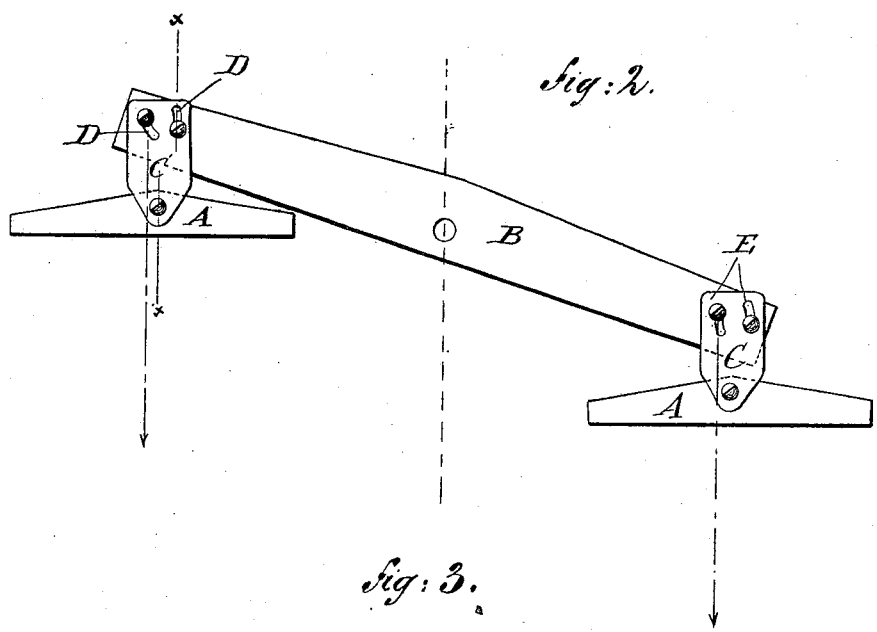
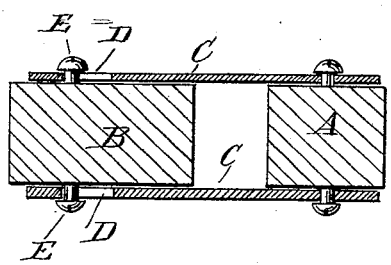
WITNESSES:
Chas Nide
C. Sedgwick
INVENTOR:
M. Brunell
BY Munn & Co
ATTORNEYS.

UNITED STATES PATENT OFFICE.

MINEHEART BRUNELL, OF ALLEGANY, NEW YORK.

DRAFT-EQUALIZER.

SPECIFICATION forming part of Letters Patent No. 265,379, dated October 3, 1882.

Application filed July 6, 1882. (Model.)

*To all whom it may concern:*

Be it known that I, MINEHEART BRUNELL, of Allegany, in the county of Cattaraugus and State of New York, have invented a new and Improved Draft-Equalizer, of which the following is a full, clear, and exact description.

The object of my invention is to provide a new and improved device for equalizing the draft of a team of horses, so that when one animal pulls in advance of the other the animal that draws less will have a greater leverage than the other animal.

The invention consists in the combination, with a double-tree and two single-trees, of clips or plates to which the single-trees are held, which plates are provided with two slots, through which pins pass into the double-tree, whereby when one animal pulls in advance of the other these plates or clips will turn, so that the animal that pulls in advance of the other will have a shorter leverage than the other animal.

Reference is to be had to the accompanying drawings, forming part of this specification, in which similar letters of reference indicate corresponding parts in all the figures.

Figure 1 is a plan view of my improved draft-equalizer, showing it in the normal position. Fig. 2 is a plan view of the same, showing one single-tree in advance of the other. Fig. 3 is a cross-sectional elevation of the same on the line $x$ $x$, Fig. 2.

Two single-trees, A, are held to the ends of a double-tree, B, by clips or plates C on the top and bottom of the double-tree, between the outer ends of which clips or plates the single-trees are pivoted by means of pintles. At the rear ends these plates are provided with slightly curved longitudinal slots D, through which pins or rivets E pass into the double-tree. The single-trees can be attached to the clips or plates C in any other suitable manner. If one animal pulls more than the other, the double-tree B will be inclined in the horizontal plane to the pole, as per example shown in Fig. 2. The single-tree in advance of the other will act on its inner pin, E—that is, on the one nearest the middle of the double-tree—and the single-tree back of the other will act on its pin E farthest from the middle of the double-tree, and will thus have a longer leverage than the other single-tree in advance of it. The weaker animal will thus always have a greater leverage than the stronger animal.

The draft-equalizer always adjusts itself automatically, according to the draft of the animals. The difference in the leverage can be increased or decreased more or less by increasing or decreasing the distance the slots D are separated from each other.

Having thus fully described my invention, I claim as new and desire to secure by Letters Patent—

1. A draft-equalizer made substantially as herein shown and described, and consisting of two single-trees held to a double-tree by pins passing through two slots in each plate or clip, to which the single-trees are pivoted or held into the double-tree, as set forth.

2. In a draft-equalizer, the combination, with the double-tree B and the single-trees A, of the plates or clips C, provided with two slots, D, each, to which plates or clips the single-trees are held, and of pins E, passing through the slots D into the double-tree, substantially as herein shown and described, and for the purpose set forth.

MINEHEART BRUNELL.

Witnesses:
N. A. DYE,
M. M. DYE.